United States Patent
Goel et al.

(10) Patent No.: US 9,546,807 B2
(45) Date of Patent: Jan. 17, 2017

(54) MANAGING HIGH PRESSURE EVENTS IN AIR CONDITIONERS

(71) Applicant: Lennox Industries Inc., Richardson, TX (US)

(72) Inventors: Rakesh Goel, Irving, TX (US); Thomas Pate, Dallas, TX (US)

(73) Assignee: Lennox Industries Inc., Richardson, TX (US)

( * ) Notice: Subject to any disclaimer, the term of this patent is extended or adjusted under 35 U.S.C. 154(b) by 475 days.

(21) Appl. No.: 14/109,785

(22) Filed: Dec. 17, 2013

(65) Prior Publication Data

US 2015/0168036 A1    Jun. 18, 2015

(51) Int. Cl.
F25B 49/02    (2006.01)

(52) U.S. Cl.
CPC ............ *F25B 49/02* (2013.01); *F25B 2339/04* (2013.01); *F25B 2341/0661* (2013.01); *F25B 2400/075* (2013.01); *F25B 2500/07* (2013.01); *F25B 2600/0251* (2013.01); *F25B 2600/17* (2013.01); *F25B 2600/23* (2013.01); *F25B 2600/2513* (2013.01); *F25B 2700/2106* (2013.01); *F25B 2700/2116* (2013.01)

(58) Field of Classification Search
CPC ................ F25B 49/02; F25B 2341/066; F25B 2341/0661; F25B 2400/0411; F25B 2400/075; F25B 2500/07; F25B 2600/0251; F25B 2600/17; F25B 2600/23; F25B 2600/2513; F25B 2700/2106; F25B 2700/2116
USPC ................................................... 62/197, 222
See application file for complete search history.

(56) References Cited

U.S. PATENT DOCUMENTS

| | | | |
|---|---|---|---|
| 3,977,205 A | 8/1976 | Dreisziger et al. | |
| 4,562,700 A | 1/1986 | Atsumi | |
| 2002/0195240 A1 | 12/2002 | Kraay | |
| 2006/0162377 A1 | 7/2006 | Collings | |
| 2006/0266060 A1 | 11/2006 | Choi | |
| 2008/0202140 A1* | 8/2008 | Sienel | F25B 9/008 62/246 |
| 2009/0320506 A1 | 12/2009 | Lifson | |
| 2012/0167602 A1* | 7/2012 | Taras | F25B 49/02 62/115 |

FOREIGN PATENT DOCUMENTS

| | | |
|---|---|---|
| CN | 1645016 | 7/2005 |
| CN | 169055 | 11/2005 |
| WO | 2010037186 A1 | 4/2010 |

\* cited by examiner

*Primary Examiner* — Marc Norman
(74) *Attorney, Agent, or Firm* — Bell Nunnally & Martin LLP; Craig J. Cox (57) ABSTRACT

In various implementations, an air conditioner may include one or more compressors, more than one expansion device, and/or a microchannel condenser. High pressure events may occur during operation of the air conditioner and may be identified. When a high pressure event is identified a bypass operation may be allowed.

20 Claims, 3 Drawing Sheets

FIG. 4

MANAGING HIGH PRESSURE EVENTS IN AIR CONDITIONERS

TECHNICAL FIELD

The present disclosure relates to managing high-pressure events in air conditioners.

BACKGROUND

When air conditioner operations are changed (e.g., from full operation of compressors to partial operation of compressor(s) and/or from off to full operation of compressors) refrigerant may collect in a portion of the air conditioner. The accumulation of refrigerant may cause the pressure in the air conditioner or portions thereof to spike, for example, during the current operation or at the beginning of the next operation.

SUMMARY

In various implementations, an air conditioner may include one or more compressors and/or more than one expansion device. During operation of the air conditioner, high pressure events may occur. A determination may be made whether a high pressure event is occurring (e.g., a mechanical relief valve and/or by measuring a property of the air conditioner such as pressure and identifying a high pressure event); and when a high pressure event occurs, a portion of the refrigerant may be allowed to bypass the primary expansion device. Allowing at least a portion of the refrigerant to bypass the primary expansion device may inhibit shut down of the air conditioner (e.g., due to a high pressure switch trip and/or mechanical failure).

In various implementations, an air conditioner may include a microchannel condenser, compressor(s), a primary expansion device, and a bypass line. The flow through the bypass line may be allowed and/or restricted in various modes of operation of the air conditioner. The bypass line may include a secondary expansion device and/or a bypass valve. When refrigerant flow is allowed through the bypass line, a first portion of refrigerant in the air conditioner may bypass the primary expansion device and may be provided to the secondary expansion device.

Implementations may include one or more of the following features. The air conditioner stored in a memory of the system. The memory may store one or more properties of high pressure events (e.g., criterion and/or criteria to facilitate identification of high pressure events). The controller may identify at least one high pressure event of the air conditioner based at least partially on one or more of the stored properties of high pressure events. If at least one high pressure event is identified, then the controller may allow a first portion of the refrigerant to bypass the primary expansion device and allow the first portion of the refrigerant to be provided to the secondary expansion device. If at least one high pressure event is not identified, then the controller may allow the first portion of the refrigerant to flow to the primary expansion device and restrict flow through the bypass line. In some implementations, the secondary expansion device includes an orifice, a line comprising a smaller cross-sectional area than a cross-sectional area of a line coupled to another component of the air conditioner, a thermal expansion valve, an electronic expansion device, and/or a bypass thermal expansion valve. The air conditioner may include more than one compressor, such as a tandem compressor assembly that includes a first compressor and at least one second compressor. In some implementations, the primary expansion device and/or the secondary expansion device may include a thermal expansion valve. The thermal expansion valve may include a bulb and a heat transfer element. A temperature of the bulb may at least partially control an amount of refrigerant allowed to pass through the thermal expansion valve. The controller may allow heat transfer between at least one of the heat transfer elements and the bulb to alter a temperature of the bulb prior to allowing the first portion of the refrigerant to bypass the primary expansion valve, in some implementations. The amount of refrigerant allowed to flow through the thermal expansion valve may be adjusted based at least partially on the altered temperature of the bulb. The bypass line may include a secondary expansion device and a bypass line, in some implementations. When the bypass valve is open, the first portion of the refrigerant in the air conditioner may be allowed to bypass the primary expansion device. The bypass line may include a secondary expansion device adapted to restrict and allow flow through the bypass line (e.g., based on an operation of the air conditioner).

In various implementations, at least one high pressure event of an air conditioner may be identified and a first portion of a refrigerant in the air conditioner may be allowed to bypass a primary expansion device, if a high pressure event is identified. The first portion of the refrigerant may be provided to a secondary expansion device, if the high pressure event is identified.

Implementations may include one or more of the following. A second portion of the refrigerant may be provided to the primary expansion device. In some implementations, a determination may be made whether identified high pressure event(s) have terminated. The flow of refrigerant through the bypass line (e.g., secondary expansion device) may be restricted if a determination is made that one or more of the identified high pressure events has terminated. Identifying high pressure event(s) may include determining an ambient temperature and/or pressure of the air conditioner and identifying a high pressure event at least partially based on when the determined ambient temperature exceeds a predetermined high ambient temperature and the determined pressure. The air conditioner may include a first compressor and a second compressor, in some implementations. Identifying high pressure event(s) may include determining whether a change in operation of the air conditioner from a first setting to a second setting and/or a third setting is occurring. The first setting may include allowing operation of the first compressor of the air conditioner and the second compressor of the air conditioner. The second setting may include allowing operation of the first compressor and restricting operation of the second compressor. The third setting may include restricting operation of the first compressor and restricting operation of the second compressor. The high pressure event may be identified when a determination is made that the change in operation of the air conditioner from the first setting to the second setting and/or the third setting is occurring. In some implementations, identifying high pressure event(s) may include identifying a high pressure event when a determination is made that the refrigerant level in the air conditioner is overcharged and/or determining whether a pressure of at least a portion of the air conditioner exceeds a predetermined high pressure. In some implementation, operation of the air conditioner may be allowed. Operation of the air conditioner may include allowing refrigerant to flow from an evaporator of the air conditioner to the compressor(s) of the air conditioner; allowing refrigerant to flow from the compressor(s) to a microchannel condenser of the air conditioner; and, allowing refrigerant to flow from the microchannel condenser to the primary expansion device and/or the secondary expansion device. Identifying at least one high pressure event may include identifying at least one high pressure event during the operation of the air conditioner.

In various implementations, at least one high pressure event in an air conditioner may be identified. If at least one high pressure event is identified, a bypass operation and/or a compressor delay operation may be allowed. A bypass operation of the air conditioner, may include allowing a first portion of a refrigerant in the air conditioner to bypass a primary expansion device of the air conditioner and allowing the first portion of the refrigerant to be provided to a secondary expansion device of the air conditioner. The compressor delay operation of the air conditioner may include retrieving a wait time; allowing operation of a first compressor of the air conditioner; restricting operation of a second compressor of the air conditioner for a period of time approximately equal to the retrieved wait time; and allowing operation of the second compressor after the period of time. The wait time based on one or more properties of the air conditioner or component thereof, such as the primary expansion device and/or the secondary expansion device. Allowing a bypass operation and/or a compressor delay operation may inhibit shut down of the air conditioner (e.g., mechanical shut down, such as allowing a high pressure switch to be activated; a controller based shut down, in which the controller monitors properties of the air conditioner and shuts down the air conditioner or portions thereof, to for example, inhibit damage to portions of the air conditioner; and/or combinations thereof. In some implementations, if at least one high pressure event is not identified, the first portion of the refrigerant may be provided to the primary expansion device and a flow of refrigerant through the secondary expansion device may be restricted. In some implementations, if at least one high pressure event is not identified, the first portion of the refrigerant may be provided to the primary expansion device and a bypass valve may be closed such that a flow of refrigerant through the secondary expansion device is inhibited. The primary expansion device and/or the secondary expansion device may automatically controls an amount of refrigerant allowed to pass through the expansion device. In some implementations, when at least one high pressure event is identified, a bypass operation and a compressor delay operation are allowed such that a bypass operation may be allowed prior to allowing operation of the first compressor and/or the second compressor.

The details of one or more implementations are set forth in the accompanying drawings and the description below. Other features, objects, and advantages of the implementations will be apparent from the description and drawings.

BRIEF DESCRIPTION OF THE DRAWINGS

For a more complete understanding of this disclosure and its features, reference is now made to the following description, taken in conjunction with the accompanying drawings, in which.

Like reference symbols in the various drawings indicate like elements.

DETAILED DESCRIPTION

In various implementations, operation of an air conditioner with one or more compressors and/or more than one expansion device may be managed. When an air conditioner switches between operations (e.g., from full operation of compressors to partial operation of compressor(s) and/or from off to full operation of compressors), a pressure may spike (e.g., a slow increase in pressure and/or a rapid increase in pressure, such as a change by at least 5%, 10%, and/or 20%). For example, an air conditioner with a microchannel condenser may operate at a first range of operating pressures, such as approximately 595 psi to approximately 605 psi. The air conditioner may include a high pressure switch which releases pressure from the system at a predetermined high pressure value, such as approximately 640 psi. Thus, a pressure increase of approximately 35 psi to approximately 45 psi whether over a period of seconds or days would cause the high pressure switch to be tripped. For example, when an air conditioner that is off switches on, a discharge pressure of the compressor(s) may spike above a predetermined high pressure value (e.g., 600 psi and/or 640 psi), which may cause the air conditioner to shut down. Thus, by managing high pressure events, a shut down of the air conditioner to be avoided, in some implementations.

An expansion device, such as a thermal expansion valve and other expansion devices, may include operational delays. For example, the time for an expansion device to adjust from a first setting to a second setting may take a period of time (e.g., an operational delay value). When an automatically adjusting expansion device (e.g., a thermal expansion device) determines that a setting is to be adjusted based on properties of the air conditioner or portions thereof, a delay may exist between the time the determination is made to adjust the setting of the expansion device and the time that the adjustment is completed. The operational delay of the expansion device may cause pressure spikes, in some implementations. For example, when an expansion valve has an operational delay and a pressure spike due to a response time of the expansion valve, may accumulate in portions of the air conditioner (e.g., since the expansion device may be closed and/or operation of one or more compressors may be restricted). Thus, to inhibit shut down of the air conditioner (e.g., due to the conditions that caused the high pressure event), a portion of the refrigerant may bypass a primary expansion valve.

Figure 1:
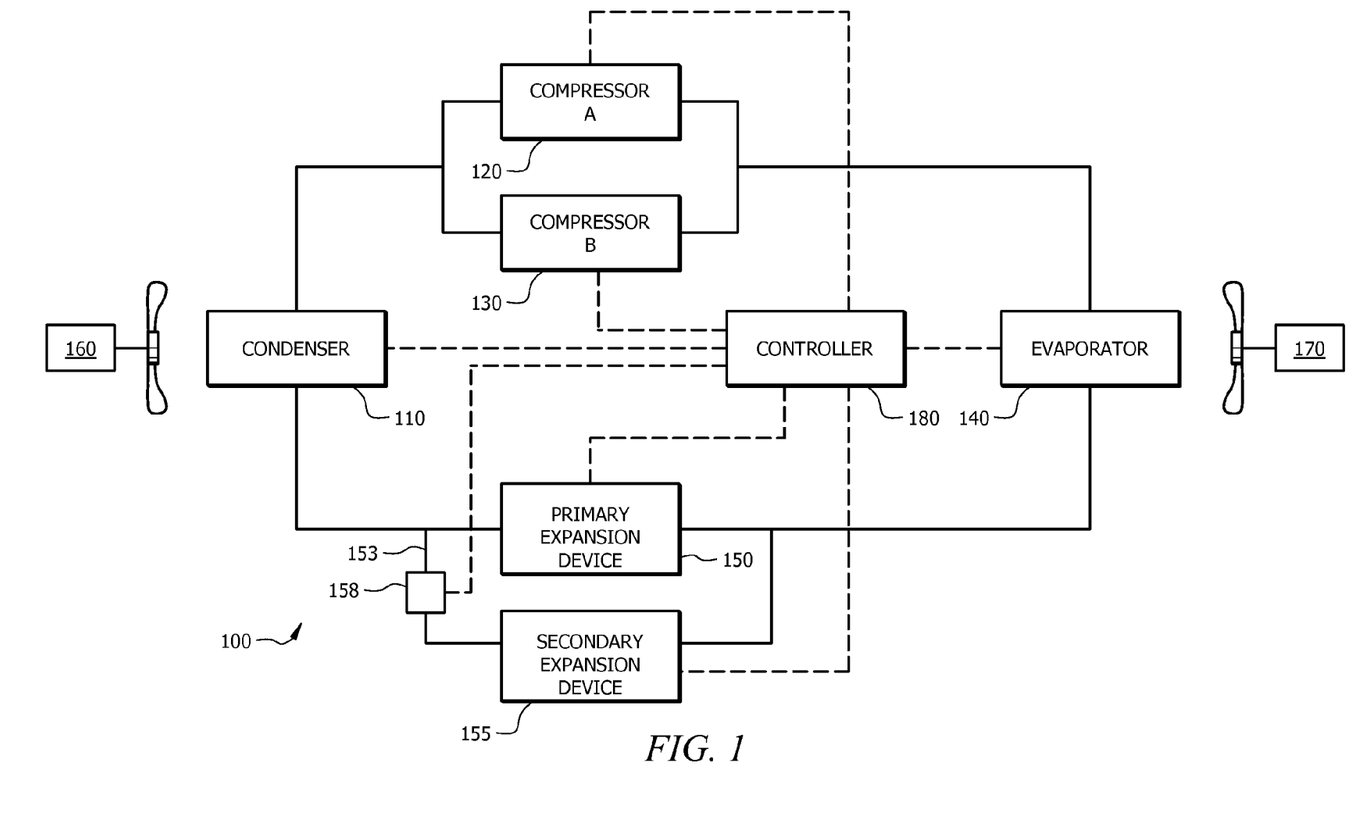
FIG. 1 illustrates an implementation of an example air conditioner.

FIG. 1 illustrates an implementation of an example air conditioner 100. The air conditioner 100 may include components such as a condenser 110, compressor A 120, compressor B 130, evaporator 140, primary expansion device 150, and/or a secondary expansion device 155. Lines (e.g., tubing) may couple various components and allow refrigerant to flow in and/or out of various components of the air conditioner 100. Fans 160, 170 may cause air to flow through the condenser 110 and/or the evaporator 170.

The condenser may include any appropriate condenser. In some implementations, the condenser may be a microchannel condenser (e.g., condenser with a channel size less than approximately 1 mm). Microchannel condensers may be sensitive to operating conditions during operation of the air conditioner (e.g., when compared with other condensers (e.g., condenser with tube size greater than 5 mm)). For example, microchannel condensers may be sensitive to refrigerant charge (e.g., a level of refrigerant in the system). When a microchannel condenser has a refrigerant charge greater than a maximum operating charge, the pressure in the microchannel condenser may become elevated due to the refrigerant capacity size difference between the microchannel condenser and the evaporator. The high pressures (e.g., pressures greater than approximately 615 psi, with a refrigerant that includes R-410A refrigerant) may cause mechanical failure, including prefailure events, such as excessive wear on parts and/or high pressure switch activations. Thus, when refrigerant pools in portions of the air conditioner and/or when a high pressure event is occurring, the pressure in the microchannel condenser may become elevated (e.g., since the capacity of the microchannel condenser may be substantially smaller than the total capacity of the air conditioner accumulation of refrigerant proximate the microchannel may cause high pressures) and mechanical failure of the air conditioning system may occur.

The compressors 120, 130 of the air conditioner may include any appropriate arrangement of compressors (e.g., in series and/or in parallel). The compressors 120, 130 may include a tandem compressor system. The tandem compressor system may allow more than one compressor (e.g., compressor A 120 and compressor B 130) to share discharge lines and suction lines.

Compressor A 120 and/or compressor B 130 may include single stage and/or multi-stage (e.g., more than one stage) compressors. Compressor A 120 and Compressor B may be independently operable, in some implementations. For example, compressor A 120 may be allowed to operate and compressor B may be restricted from operation.

The air conditioner may include a primary expansion device 150 and a bypass line 153, which includes a secondary expansion device 155, as illustrated. The primary expansion device 150 and/or the secondary expansion device 155 may include any device that at least partially expands refrigerant passing through the device. For example, the primary expansion device 150 and/or the secondary expansion device 155 may include a thermal expansion valve; a bleed thermal expansion valve (e.g., a thermal expansion valve with a bleed, such as a groove); an orifice; a line with a cross-sectional area that is less than a cross-sectional area of a line coupled to another portion of the system (e.g., primary expansion device, compressor, condenser, and/or evaporator), such as a capillary tube utilized in refrigeration and heating systems; and/or an electronic expansion valve.

In some implementations, the primary expansion device 150 may include a line (e.g., tubing) with a cross-sectional area (e.g., diameter) that is less than a cross-sectional area (e.g., diameter) of a line (e.g., tubing) coupled to the secondary expansion device 155, the condenser 110, the compressor 120, and/or the evaporator 140. The secondary expansion device 155 may include a line (e.g., tubing) with a cross-sectional area (e.g., diameter) that is less than a cross-sectional area (e.g., diameter) of a line (e.g., tubing) coupled to the primary expansion device 150, the condenser 110, the compressor 120, and/or the evaporator 140.

In some implementations, the primary expansion device 150 and/or the secondary expansion device 155 may include a thermal expansion valve with a bulb. For example, the thermal expansion device described in U.S. patent application Ser. No. 13/600,685 entitled "Controlling Metering Devices" filed on Aug. 31, 2012 may be utilized as the expansion device. As described, a control system may alter the automatic control of the thermal expansion valve by altering a temperature of the bulb. For example, the control system may include one or more heat transfer elements coupled to the bulb and a controller coupled to the heat transfer element(s). The heat transfer element(s) may be capable of altering a temperature of the bulb. For example, the heat transfer elements may generate heat and/or cold, deliver heat to, and/or remove heat from the bulb of the thermal expansion valve. For example, the bulb may be 50° F. and the heat transfer element may deliver heat to the bulb to raise the temperature of the bulb to 60° F. Thus, the automatic operation and adjustments of the thermal expansion valve may then be altered to operate based on the new altered temperature generated by the heat transfer elements. In some implementations, by including a thermal expansion valve with a bulb and heating elements in the primary expansion device and/or the secondary expansion device, the valve position (e.g., valve position as a percentage relative to of fully open or fully closed) may be altered. For example, by allowing more refrigerant to flow through the primary and/or secondary expansion device, a high pressure event may be inhibited, terminated, and/or shut down (e.g., due to high pressure switch trip and/or mechanical failure) of an air conditioner may be inhibited.

The bypass line 153 may allow at least a portion of the refrigerant to flow to the secondary expansion device 155 and bypass the primary expansion device 150. Fluid (e.g., refrigerant) flow through the bypass line 153 may be allowed and/or restricted. The flow through the bypass line may be allowed and/or restricted in various modes of operation of the air conditioner. A bypass valve 158 and/or the secondary expansion device 155 may be utilized to allow and/or restrict fluid flow through the bypass line 153.

When refrigerant flow (e.g., at least a portion of the refrigerant from another component of the air conditioner) is allowed through the bypass line, the refrigerant allowed to flow through the bypass line may be provided (e.g., via the bypass valve 158) to the secondary expansion device. The refrigerant delivered to the secondary expansion device may be at least partially expanded by the secondary expansion device and provided to the evaporator. In some implementations, the refrigerant flow may be provided to the secondary expansion device and flow through the secondary expansion device may be allowed and/or restricted to allow and/or restrict flow through the bypass line. For example, the secondary expansion device may include an electronic expansion device that closes to restrict refrigerant flow through the secondary expansion device and/or bypass line and that opens to allow refrigerant flow though the secondary expansion device and/or the bypass line.

A bypass valve 158 may be coupled proximate the secondary expansion device 155. For example, the bypass valve 158 may be coupled to a line coupling the condenser 110 and the secondary expansion device 155. The bypass valve 158 may allow and/or restrict the flow of refrigerant to the secondary expansion device 155. Thus, during a bypass operation, the valve may be opened such that a first portion of the refrigerant may be provided to the secondary expansion valve. A second portion of the refrigerant may be provided to the primary expansion valve. In some implementations, the first portion may be approximately 20% to approximately 40% of the refrigerant flow from the outlet of the condenser 110.

The bypass valve 158 may be any appropriate valve, such as a mechanical valve and/or an electronically controlled valve. For example, the bypass valve may include a mechanical valve, such as a relief valve, that opens when a pressure proximate the valve is greater than a predetermined valve high pressure. This bypass valve may close when pressure proximate the valve is less than and/or equal to the predetermined valve high pressure or a predetermined valve low pressure. Thus, when the bypass valve determines (e.g., by a mechanical trip) that the pressure is greater than a predetermined high valve pressure, the bypass valve may be opened and at least a first portion of refrigerant may be allowed to flow through the bypass valve. When the bypass valve determines (e.g., by the mechanical trip mechanism) that the pressure is less than or equal to the predetermined low valve pressure (e.g., the same or different values as the high valve pressure), the bypass valve may be closed and fluid flow through the bypass line may be restricted.

In some implementations, the bypass valve 158 may include an electronic valve. The controller may manage the operations of the bypass valve and transmit signals to the bypass valve to open, partially open, and/or close the bypass valve.

A controller 180 (e.g., a computer) may be coupled (e.g., communicably, such as by wires or linked by Wi-Fi) to component(s) of the air conditioner 100 and control various operations of the component(s) and/or system. For example, the controller 180 may include an operation module, a bypass module, and/or compressor management module, stored in a memory of the controller and executable by a processor of the controller, to perform various operations of the air conditioner 100. The operation module may control operations of the air conditioner 100, such as receiving requests for operation, determining whether to respond to requests for operation, operating various components (e.g., compressors, reversing valves, and/or expansion valves), etc. The bypass module may identify high pressure events (e.g., by identifying that a mechanical pressure trip has occurred and/or by measuring properties of the air conditioner or portions thereof and determining whether high pressure event criteria, such as measured pressure greater than a predetermined allowed high pressure, have been satisfied); determine whether to allow bypass operations (e.g., transmitting signals to a bypass valve and/or secondary expansion device that identify a setting to which the valve and/or device is to be set) and/or compressor delay operations; determine whether high pressure events are terminated, and/or other operations. The compressor management module may control operation and/or restriction of operation of the compressors of the air conditioner 100. For example, the compressor management module may determine whether to allow a wait time, determine and/or retrieve wait times, allow one or more compressors to operate and/or restrict operation of one or more compressors. In some implementations, the compressor management module may adjust the amount of refrigerant allowed to flow through the expansion device 150.

Although FIG. 1 illustrates an implementation of an air conditioner, other implementations may be utilized as appropriate. For example, the air conditioner may include any components, as appropriate. A high pressure switch may be included to shut down (e.g., restrict operation of the air conditioner) the air conditioner when a pressure in at least a portion of the air conditioner exceeds a predetermined high pressure switch value. The air conditioner may include one compressor (e.g., compressor B may not be coupled to the air conditioner and/or may not be operating) The air conditioner may include more than two compressors (e.g., a tandem compressor with four compressors). In some implementations, the expansion device may include more than one expansion device. The air conditioner may be a heat pump and may include a reversing valve to allow cooling and heating operations.

In some implementations, the bypass line of the air conditioner may not include a bypass valve. The bypass line may include a secondary expansion device such as an electronic expansion valve. The secondary expansion device may be utilized to manage fluid flow to through the bypass line. For example, the controller may determine whether to allow refrigerant flow through the bypass line (e.g., based on determining whether a high pressure event has occurred) and/or the amount of fluid flow to allow through the bypass line (e.g., based on air conditioner properties such as the speed of pressure elevation in the air conditioner and/or portions thereof). The controller of the air conditioner may then transmit a signal to the secondary expansion device to adjust and/or maintain a valve setting (e.g., open, partially open, and/or closed) of the secondary expansion device.

In some implementations, a portion of the air conditioner 100 may be disposed outside a building (e.g., an "outdoor portion" on the ground proximate a building and/or on a roof of the building) and a portion of the air conditioner may be disposed inside the building (e.g., an "indoor portion"). For example, the outdoor portion may include condenser 110 and fan 160 and the indoor portion may include the evaporator 140 and fan 170. In some implementations, such as a rooftop unit, the condenser 110, fan 160, compressor A 120, compressor B 130, evaporator 140, fan 170, and the expansion device 150 may be disposed in the outdoor portion. The outdoor and/or indoor portion may be at least partially disposed in housing(s).

During a cooling cycle of the air conditioner 100, cool air may be provided by blowing air (e.g., from fan 170) at least partially through the evaporator 140. The evaporator 140 may evaporates liquid refrigerant in the evaporator. The evaporator may reduce a temperature of the air and the cool air may be provided to a location (e.g., via ducting). The gaseous refrigerant may exit the evaporator 140, and may be compressed by compressor A 120 and compressor B 130, and delivered to a condenser 110. The condenser 110 may condense the gaseous refrigerant by blowing air (e.g., from a fan 160) at least partially through the condenser 130 to remove heat from the gaseous refrigerant.

In various implementations, the air conditioner 100 may include two or more modes of operation, such as, a bypass operation and a compressor delay operation, to inhibit shut down of an air conditioner when high pressure events are occurring. The bypass operation may open a bypass valve 158 to allow at least a portion of the refrigerant from the outlet of the condenser 110 to bypass the primary expansion device 155. The compressor delay operation may retrieve a wait time and may allow a period of time to elapse that is approximately equal to the wait time between initiating operations of compressors. Allowing one or more of the modes of operation (e.g., independently, concurrently, and/or sequentially) may reduce a pressure in at least a portion of the air conditioner and thus may inhibit shut down of the air conditioner.

Figure 2:
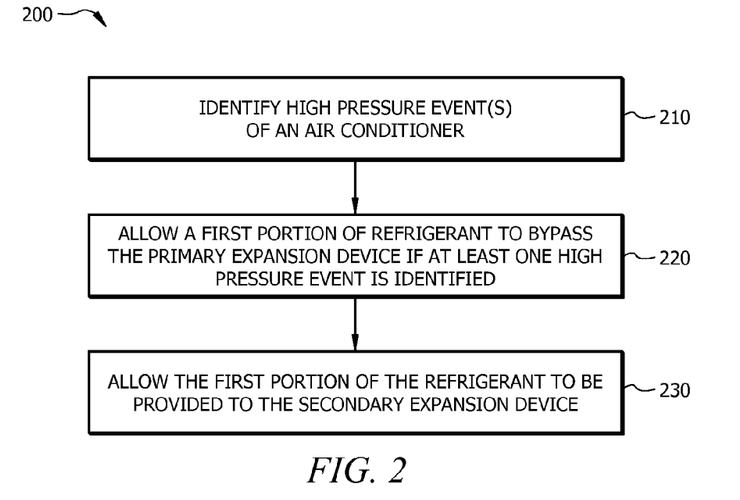
FIG. 2 illustrates an implementation of an example process for managing high pressure events.

FIG. 2 illustrates an implementation of an example process 200 for managing high pressure events. High pressure event(s) of an air conditioner may be identified (operation 210). During operation of the air conditioner, a high pressure event may occur. A high pressure event may occur when criteria, such as predetermined high pressure event criteria are satisfied by measured properties of the air conditioner. Properties of high pressure events (e.g., included in the high pressure event criteria) may be stored in a memory of the air conditioner and may be retrieved (e.g., by a module of the controller) to facilitate determinations of whether high pressure event(s) are occurring. For example, properties of the air conditioner (e.g., type of air conditioner components, pressure(s) of portions of the air conditioner, temperature(s) of the air conditioner, and/or refrigerant charge of the air conditioner and/or ambient properties such as temperature and/or humidity) proximate at least a portion of the air conditioner may be determined. The determined properties may be compared to the predetermined high pressure event criteria (e.g., which may be retrieved from a memory of the air conditioner) to determine if the predetermined high pressure event criteria are satisfied. For example, a pressure of at least a portion of the air conditioner may be determined (e.g., by sensors of the air conditioner measuring pressure(s) for portions of the air conditioner). The determined pressure may be compared (e.g., by the controller) to a predetermined high pressure, which is retrieved from a memory of the air conditioner. A high pressure event may be identified when the determined pressure exceeds the retrieved predetermined high pressure.

A first portion of refrigerant may be allowed to bypass the primary expansion device if at least one high pressure event is identified (operation 220). For example, a controller may transmit a signal to a bypass valve to allow a first portion of the refrigerant to flow though the bypass valve. For example, approximately 30% to approximately 50% of the refrigerant exiting the condenser may be allowed to pass through the bypass line. In some implementations, the bypass valve may include a pressure switch and when a pressure in the refrigerant flowing from the outlet of the condenser is greater than a predetermined high bypass pressure (e.g., greater than approximately 600 psi), the pressure switch may open the valve to allow the first portion of refrigerant to bypass the primary expansion device.

A first portion of the refrigerant may be provided to a secondary expansion device of the air conditioner (operation 230). For example, the first portion of refrigerant may flow from the outlet of the bypass valve to the secondary expansion device. The secondary expansion device may include the same and/or different types of expansion device as the primary expansion device.

Process 200 may be implemented by various systems, such as system 100. In addition, various operations may be added, deleted, and/or modified. For example, less than approximately 50% of the refrigerant exiting the condenser may be allowed to pass through the bypass line. More than one high pressure events may be identified. In some implementations, an operation of the air conditioner may be allowed. The operation of the air conditioner may include allowing refrigerant to flow from an evaporator of the air conditioner to two compressors of the air conditioner; allowing refrigerant to flow from the two compressors to a microchannel condenser of the air conditioner; and allowing refrigerant to flow from the microchannel condenser to at least one of the primary expansion device or a second expansion device of the air conditioner. Identifying at least one high pressure event may include identifying at least one high pressure event during the operation of the air conditioner, in some implementations.

In some implementations, a high pressure event may be identified when a mechanical pressure switch (e.g., mechanical trip) has been activated. For example, the bypass valve in a bypass line may include a mechanical pressure switch that allows flow through the bypass line when the pressure exceeds a predetermined high valve pressure. The bypass valve may restrict flow through the bypass line when the pressure is less than or equal to a predetermined low valve pressure.

In some implementations, a high pressure event may be identified based at least partially on pressures in the air conditioner and/or portions thereof and ambient temperatures. For example, an ambient temperature proximate at least a portion of the air conditioner (e.g., condenser) and a pressure of the air conditioner (e.g., proximate the condenser) may be determined. Sensor(s) of the air conditioner may measure the ambient temperature and/or pressure in the air conditioner and/or portions thereof, in some implementations. A predetermined high ambient temperature (e.g., 116 degrees Fahrenheit and/or 95 degrees Fahrenheit) may be retrieved from a memory of the air conditioner. The determined ambient temperature may be compared to the predetermined high ambient temperature. A predetermined high pressure associated with the determined ambient temperature may be determined. For example, a list of associations may be retrieved that associates ambient temperatures with a value for a predetermined high pressures (e.g., the value may correlate to a pressure that the air conditioner and/or portions there of may be allowed to operate while minimizing a risk of a pressure spike). A high pressure event may be identified when the determined temperature exceeds the predetermined high ambient temperature and when a determined pressure exceeds the predetermined high pressure.

In some implementations, a high pressure event may be identified when predetermined changes occur in compressor operations. A set of compressors may include more than one setting corresponding to different operations of each of the compressors. A first setting may include when each compressor of the air conditioner is allowed to operate. For example, in an air conditioner with two compressors, a first setting may occur when both compressors are allowed to operate. If the compressors are multi-stage compressors with a low setting and one or more higher settings, the first setting of the compressors may correspond to each compressor operating at one of the higher settings. A second setting may occur when at least one of the compressors is restricted from operation. For example, in an air conditioner with two compressors, a second setting may occur when an operation of a first compressor is allowed and operation of a second compressor is restricted. A third setting may include when operation of each of the compressors in an air conditioner is restricted. For example, in an air conditioner with two compressors, a third setting may occur when operation of both compressors is restricted.

Thus, to determine when predetermined changes occur in a compressor operation, compressor operations may be monitored (e.g., by a module of the controller). A first predetermined change may occur when the air conditioner operation changes from a first setting to a second setting, such as when an air conditioner operation changes from a full load to a partial load and/or when the air conditioner operation changes from a part load to a full load. A second predetermined change may occur when an air conditioner operation changes from a first setting to a third setting, such as when an air conditioner operation changes from no load to full load and/or when the air conditioner changes from a full load to no load. The controller (e.g., a module of the controller) may monitor changes in operation and determine when an air conditioner operation includes a first predetermined change and/or a second predetermined change. A high pressure event may be identified (e.g., by a module of the controller) when a determination is made that the first predetermined change and/or the second predetermined change has been identified. Criteria for the first predetermined change, second predetermined change, and/or other types of predetermined changes (e.g., changes that may cause a high pressure spike in at least a portion of the air conditioner) may be stored in a memory of the air conditioner.

In some implementations, a high pressure event may be identified based on a refrigerant charge of the air conditioner. For example, an air conditioner may include a specification that includes a range of values for the refrigerant charge during operation. When refrigerant is added to the air conditioner (e.g., at a factory, during installation, and/or during repairs), a greater amount of refrigerant than is specified in the specification may be added to the air conditioner. When a determination is made that a refrigerant level in an air conditioner is overcharged (e.g., refrigerant charge is greater than the range of values in the specification), a high pressure event may be identified.

Figure 3:
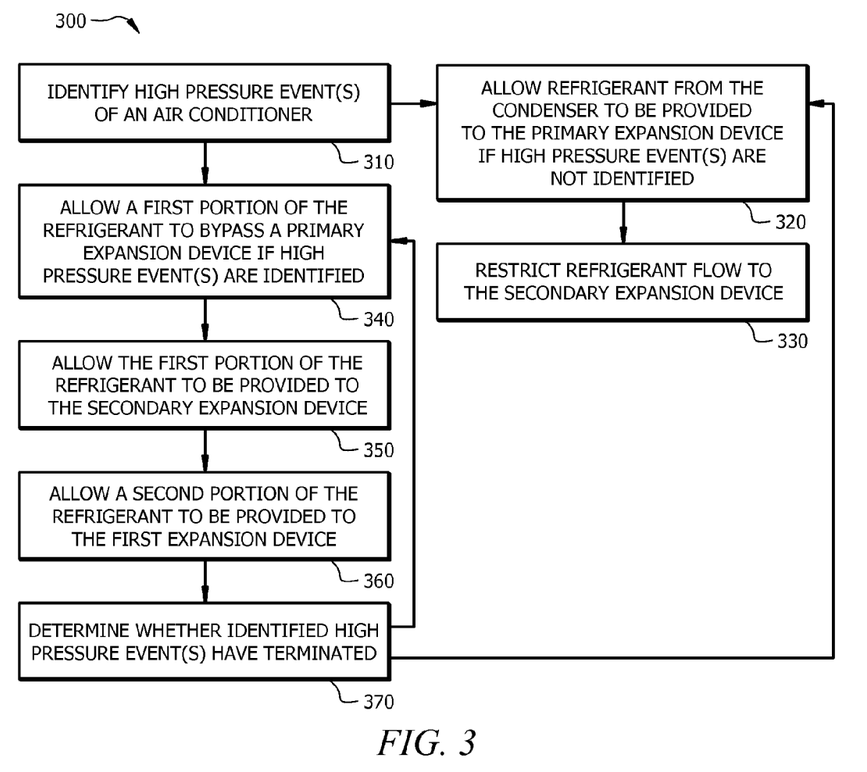
FIG. 3 illustrates an implementation of an example process for managing high pressure events using a bypass operation.

FIG. 3 illustrates an implementation of an example process 300 for managing high pressure events using a bypass operation. High pressure event(s) may be identified (operation 310). For example, properties of the air conditioner, such as pressure, ambient temperature, and/or compressor operations may be monitored. The properties of high pressure events may be retrieved from a memory of the air conditioner and compared to the monitored properties of the air conditioner. A high pressure event may be identified based on the comparison.

Refrigerant may be provided from the condenser to the primary expansion device if high pressure event(s) are not identified (operation 320). The refrigerant from an outlet of the condenser may flow to the primary expansion device.

Refrigerant flow through the secondary expansion device may be restricted (operation 330). Flow through the bypass line may be restricted. For example, the bypass valve may be closed (e.g., by a controller). In some implementations, the secondary expansion device may restrict refrigerant flow through the bypass line.

If high pressure event(s) are identified, then a first portion of the refrigerant may be allowed to bypass the primary expansion device (operation 340). For example, a bypass valve may be opened and a first portion of the refrigerant from the outlet of the condenser may be allowed to flow through the bypass valve. The bypass valve and/or lines coupled to the bypass line may be sized to control the amount of the first portion.

The first portion of the refrigerant may be provided to the secondary expansion device. By allowing the first portion of the refrigerant to flow through the secondary expansion device rather than the first expansion device, a pressure of at least a portion of the system may be reduced. By reducing the pressure of at least a portion of the system, shut down of the air conditioner may be inhibited. For example, a high pressure event may indicate elevated pressures in the system and/or rapid changes in pressure. If pressures in at least a portion of the air conditioner exceed a predetermined high operation pressure, the air conditioner may be shut down (e.g., operation of one or more components of the air conditioner may be restricted, such as the compressors and/or condenser; and/or the primary and/or secondary expansion devices may restrict refrigerant flow through the expansion devices). Thus, since allowing the first portion of the refrigerant flow through the secondary expansion device rather than the first expansion device, pressures may be reduced in at least a portion of the system and shut down of the air conditioner may be inhibited.

A second portion of the refrigerant may be provided to the first expansion device (operation 360). Flow to the first expansion device may not be restricted by allowing the bypass operation (e.g., flow through the bypass valve and secondary expansion device). Thus, a second portion of the refrigerant may be allowed to flow through the first expansion device. The second portion of the refrigerant may be greater than the first portion of the refrigerant. For example, approximately 50-70% of the refrigerant from the outlet of the condenser may flow to the first expansion device and the remaining refrigerant may flow to the secondary expansion device.

A determination may be made whether the identified high pressure event(s) have been terminated (operation 370). A high pressure event may be terminated when high pressure event criteria are no longer satisfied by the monitored properties of the air conditioner. For example, when an ambient temperature drops to less than a predetermined high ambient temperature, then the high pressure event associated with elevated ambient temperatures may be terminated. A determination may be made whether the identified high pressure event(s) have been terminated so that a determination of whether to continue to allow a bypass operation (e.g., when refrigerant is provided to the secondary expansion device) or whether to terminate the bypass operation. For example, efficiency (e.g., cost and/or IEER, integrated energy efficiency ratio) may decrease when allowing the bypass operation. However, to inhibit shut down of the air conditioner, the bypass operation may be allowed despite the decrease in efficiency decrease. Thus, when high pressure event(s) have been terminated and thus the probability of shut down of the air conditioner is decreased (e.g., when compared with the probability of shut down during a high pressure event), the primary expansion device and its associated higher efficiency may be utilized.

When a determination is made (e.g., by a module of a controller) that identified high pressure event(s) have not been terminated, a first portion of the refrigerant from the outlet of the condenser may be allowed to bypass the primary expansion device (operation 340). When a determination is made that identified high pressure events have been terminated, refrigerant from the condenser may be provided to the primary expansion device (operation 320) and refrigerant flow through the secondary expansion device maybe restricted (operation 330).

Process 300 may be implemented by various systems, such as system 100. In addition, various operations may be added, deleted, and/or modified. In some implementations, process 300 may be performed in combination with other processes such as process 200. For example, a bypass valve may include a pressure switch that controls the flow of refrigerant through the bypass valve. In some implementations, the condenser may include a microchannel condenser. Since microchannel condensers may be sensitive to pressure changes (e.g. when compared to condensers with larger sized channels or tubes), identification of high pressure events and allowing bypass operations may increase user satisfaction by inhibiting air conditioner shut down. In some implementations, since tandem compressors may cause more changes in pressure (e.g., when compared to air conditioners with one compressor) and associated high pressure events, the ability to identify high pressure events and inhibit shut down of the air conditioner may increase user satisfaction.

Figure 4:
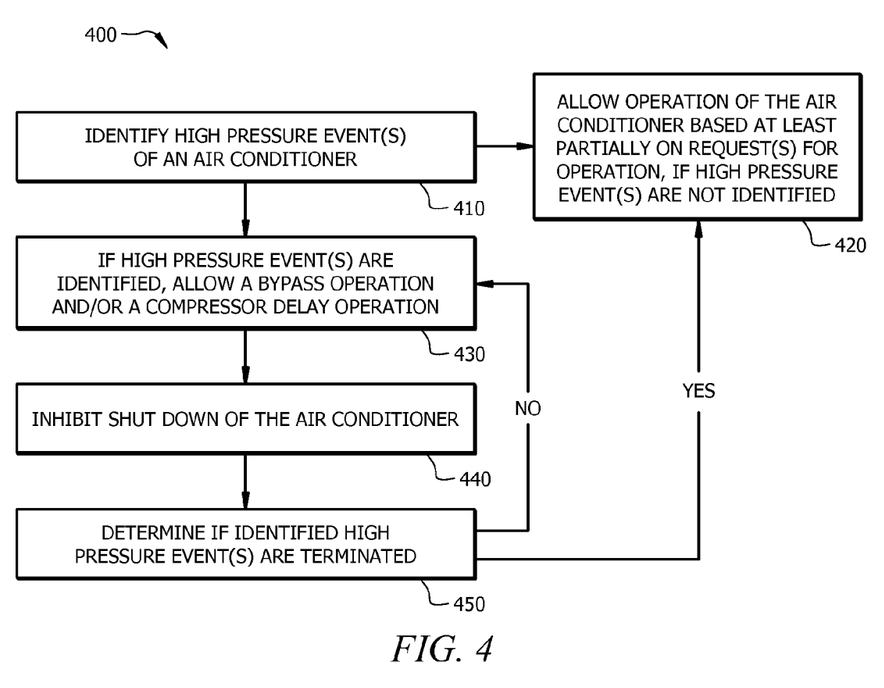
FIG. 4 illustrates an implementation of an example process for managing high pressure events using a bypass operation and/or a compressor delay operation.

In some implementations, one or more modes of operation may be utilized to inhibit shut down of the air conditioner during high pressure event(s). FIG. 4 illustrates an implementation of an example process 400 for managing high pressure events using a bypass operation and/or a compressor delay operation. High pressure event(s) may be identified (operation 410). For example, a controller (e.g., a module of the controller) monitor one or more properties of the air conditioner and compared the monitored properties to predetermined high pressure event properties (e.g., retrieved by the module from a memory of the computer). The identification of high pressure event(s) may be based on the comparison.

If high pressure event(s) are not identified, operation of the air conditioner may be allowed based at least partially on request(s) for operation (operation 420). For example, a user may request operation of an air conditioner, and an operation of the air conditioner may be allowed to satisfy the request. In some implementations, refrigerant may be allowed to flow from an evaporator of the air conditioner to two compressors of the air conditioner. The refrigerant may exit the discharge of the two compressors (e.g., one or more discharge lines) and be provided to a condenser, such as a microchannel condenser. The refrigerant may be provided from an outlet of the condenser to the primary expansion device. Refrigerant flow through the second expansion device of the air conditioner may be restricted (e.g., by the bypass valve). Refrigerant exiting the primary expansion device may then be provided to the evaporator.

If high pressure event(s) are identified, a bypass operation and/or a compressor delay operation may be allowed (operation 430). The bypass operation may allow at least a portion of the refrigerant from an outlet of the condenser to bypass the primary expansion device. For example, a bypass valve may be opened and flow through the secondary expansion device may be allowed. A compressor delay operation may allow initiation of operation of one or more second compressors to be delayed by a wait time after the initiation of operation of a first compressor. A controller (e.g., a module of the controller) may determine which mode of operation to allow and/or how many modes of operation to allow.

In some implementations, the controller may allow the bypass operation when a first criterion is satisfied and/or may allow the compressor delay operation when a second criterion is satisfied. For example, the controller may allow the bypass operation and the compressor delay operation. A bypass operation and a compressor delay operation may be allowed when a compressor of the air conditioner changes from a full load to a part load, a part load to a full load, from being off to a full load, and/or being off to a part load. A bypass operation may be allowed to commence and an operation of a compressor may be restricted; and, after a period of time elapses, the operation of the compressor may be allowed, in some implementations. The bypass operation may be restricted after the operation of the compressor is allowed and/or may be restricted after a predetermined period of time elapses after the operation of the compressor is allowed. In some implementations, such as operation during high ambient temperatures (e.g., ambient temperatures greater than a predetermined ambient temperature), a bypass operation may be allowed and a compressor delay operation may be restricted. In some implementations, a pressure of the air conditioner or portion thereof (e.g., proximate the condenser and/or proximate a high pressure switch) may be monitored. If the pressure is greater than a predetermined switch pressure, after allowing the bypass operation, then the compressor delay operation may be allowed.

For example, during an operation of an air conditioner at a high ambient temperature, a bypass operation may be allowed. If a determination is made that the pressure of the air conditioner is greater than a predetermined switch pressure, then the compressor delay operation may be allowed. Allowing the compressor delay operation may include restricting an operation of one or more of the compressors for a period of time. For example, initially two compressors may be allowed to operate while allowing a bypass operation. If a determination is made that a pressure, for example, proximate a condenser, is greater than a predetermined switch pressure, then a compressor delay operation may be allowed. The compressor delay operation may restrict operation of one of the two compressors for a period of time. After the period of time has elapsed, the operation of the compressor, which was previously restricted, may be allowed. The bypass operation may terminate before, approximately concurrently with, and/or after the allowance of the operation of the compressor.

Shut down of the air conditioner may be inhibited (operation 440). Allowing the bypass operation and/or the compressor delay operation may reduce a pressure of at least a portion of the air conditioner. For example, a first pressure in a portion of the air conditioner may be associated with a high pressure event. A bypass operation and/or compressor delay operation may be allowed and then monitoring of the pressure in the portion of the air conditioner may result in a second measured pressure. The second measured pressure may be less than the first measured pressure. Since a high pressure event may indicate an increased probability of shut down of the air conditioner, in some implementations, a decrease in the pressure of a portion of the air conditioner may inhibit shut down of the air conditioner.

A determination may be made whether identified high pressure event(s) are terminated (operation 450). For example, the properties of the air conditioner may be monitored and a determination may be made whether the identified high pressure event(s) still exist based on the monitored properties (e.g., the monitored properties may be compared with high pressure criteria retrieved from a memory of the air conditioner by the controller).

When a determination is made (e.g., by a module of a controller) that identified high pressure event(s) have been terminated, operation of the air conditioner may be allowed at least partially based on request(s) for operation (operation 420). For example, the bypass valve may be closed and refrigerant flow through the secondary expansion device may be restricted. Restricting flow through the secondary expansion device when a high pressure event does not exist and/or has been terminated may increase the efficiency, such as IEER (e.g., when compared with allowing the air conditioner to operate while allowing flow through the secondary expansion valve). When a determination is made that identified high pressure events have not been terminated, a bypass operation and/or a compressor delay operation may be allowed (operation 430).

Process 400 may be implemented by various systems, such as system 100. In addition, various operations may be added, deleted, and/or modified. In some implementations, process 400 may be performed in combination with other processes such as process 200 and/or process 300. For example, a first mode of operation (e.g., bypass operation) may be allowed and a second mode of operation (e.g., compressor delay operation) may be restricted during operation of the first mode of operation. In some implementations, a first mode of operation (e.g., bypass operation) may be allowed during at least a portion of a second mode of operation (e.g., compressor delay operation). In some implementations, a first mode of operation may be allowed when a high pressure event is identified. When a determination is made that a high pressure event has not been terminated, a second mode of operation may be allowed in addition to and/or in replacement of the first mode of operation. For example, when a high pressure event is identified, a compressor delay operation may be allowed. If the compressor delay operation does not reduce the pressure of at least a portion of the air conditioner such that the identified high pressure event is terminated, then a bypass operation may be allowed.

In some implementations, a bypass operation may include determining whether to allow a bypass operation (e.g., based at least partially on the properties of the high pressure event, whether more than one high pressure event has been identified, whether an identified high pressure event has been determined to not have been terminated, etc.). If a determination is made to allow a bypass operation, a portion of the refrigerant exiting the condenser may be allowed to flow through the secondary expansion device. A determination may be made whether to allow a compressor delay operation in addition to the bypass operation. If a determination is made to not allow a bypass operation, a determination may be made whether to allow a compressor delay operation.

In some implementations, a compressor delay operation may include determining whether to allow a compressor delay operation. U.S. patent application Ser. No. 14/109,745 entitled "Compressor Operation Management in Air Conditioners" filed on Dec. 17, 2013 describes various implementations of compressor delay operations. As described, a signal may be transmitted to allow operation of a first compressor. For example, a controller may transmit a signal to a compressor to allow operation. A wait time may be determined. The wait time may be an amount of time to elapse prior to allowing operation of one or more additional compressors in an air conditioner. For example, a wait time may be the amount of time that elapses between allowing a first compressor to operate and allowing one or more second compressors to operate. A wait time may be based at least partially a property of the air conditioner or portion thereof. For example, the wait time may be based at least partially on a property of the primary expansion device and/or secondary expansion device (e.g., response time); a property of the air conditioner (e.g., types of at least a portion of the air conditioner (e.g., condenser); and/or ratio of condenser volume to evaporator volume). In some implementations, a wait time may be retrieved (e.g., from a memory coupled to the air conditioner). After a period of time approximately equal to the wait time has elapsed (e.g., from the time that operation of the first compressor was allowed), the second compressor may be allowed to operate (e.g., a signal may be transmitted to allow operation of a second compressor).

Restricting operation of the second compressor during the wait time may allow circulation of at least a portion of the refrigerant in at least a portion of the air conditioner by the first compressor. For example, the wait time may be based at least partially on the response time of the expansion device. When at least a portion of the air conditioner operation is restricted, the expansion device may restrict the flow of refrigerant through the air conditioner (e.g., a thermal expansion valve may be closed). The refrigerant may then accumulate proximate the expansion device and/or the condenser. When the air conditioner is allowed to operate (e.g., in response to a request), the accumulated refrigerant may cause the pressure in the condenser to elevate quickly since the expansion device may have a delay in opening (e.g., based on a response time of the expansion device). In a microchannel condenser and/or other types of pressure sensitive condensers, a high pressure event may then occur due to the accumulated refrigerant effects. The high pressure event may restrict operation of the air conditioner and thus inhibit responding to requests for operation. By allowing the first compressor to operate while restrict the second compressor, instability, such as pressure spikes, may be inhibited. Other implementations and/or features of the compressor delay operation are described in U.S. patent application Ser. No. 14/109,745 entitled "Compressor Operation Management in Air Conditioners" filed on Dec. 17, 2013.

In some implementations, the first expansion device and/or the second expansion device may include a thermal expansion device. For example, a thermal expansion device may include a thermal expansion valve that includes a bulb, as described in U.S. patent application Ser. No. 13/600,685. As described, since the valve position is based on the temperature of the bulb, heat transfer elements may be coupled to the bulb and to allow adjustment of the temperature of the bulb and thus adjustment of the valve position (e.g., open, partially open and/or closed). In some implementations, this thermal expansion valve may be utilized to adjust the valve position before the first compressor is allowed to operation and/or during the wait time after the first compressor is allowed to operate. For example, a controller may allow the first compressor to operate and may transmit a signal to the heat transfer elements cause the temperature of the bulb of the thermal expansion valve to increase. The increase in temperature may cause the thermal expansion valve to open more and/or open more quickly (e.g., when compared with allowing the bulb to automatically adjust the valve position based on the system conditions).

In some implementations, the first expansion device and/or the second expansion device may include a thermal expansion valve, as described in U.S. patent application Ser. No. 13/600,685. The heating elements may be utilized to adjust the valve position of the first expansion device and/or the second expansion device prior to and/or during the bypass operation. For example, prior to allowing the bypass valve to open, the heating elements may allow heat to transfer to the bulb of the secondary expansion valve and adjust the valve position to allow more fluid flow through the secondary expansion device (e.g., increase the openness of the valve of the secondary expansion device). Thus, when the bypass valve is opened, accumulation of refrigerant proximate the secondary expansion device and/or at the condenser may be inhibited.

Although a specific controller has been described in FIG. 1, the controller may be any appropriate computer or other programmable logic device. The controller may include a processor that executes instructions and manipulates data to perform operations of the controller. Processor may include a programmable logic device, a microprocessor, or any other appropriate device for manipulating information in a logical manner and memory may include any appropriate form(s) of volatile and/or nonvolatile memory, such as RAM and/or Flash memory.

The memory may include data, such as predetermined property values (e.g., temperatures and/or pressure); predetermined properties of high pressure events, and/or other events to facilitate identification of when air conditioner operation should be allowed and/or restricted; high pressure event criteria; predetermined high ambient temperatures; predetermine high pressure values; predetermined high operation pressure values; wait times, adjustments to wait times, periods of time that operations should run (e.g., maximum operational time); and/or any other data useful to the operation of the air conditioner.

In addition, various software may be stored on the memory. For example, instructions (e.g., operating systems and/or other types of software), an operation module, bypass module, and/or a compressor management module may be stored on the memory. The operation module may perform one or more of the operations described in processes 200, 300, and/or 400, such as operating the air conditioner during normal operations (e.g., operations in which the system operates based at least partially on user requests for operation) and/or identifying high pressure event(s). For example, the operation module may receive requests for operation from a user and operate the air conditioner to satisfy the user request. The bypass module may perform bypass operations, such as: identifying high pressure event(s); allowing a first portion of the refrigerant to bypass a first expansion device when a high pressure event is identified; allowing the first portion to flow though the secondary expansion device when a high pressure event is identified; allowing a second portion of the refrigerant to flow through the first expansion device when a high pressure event is identified; restricting flow through a secondary expansion device when a high pressure event is not identified and/or when an identified high pressure event is terminated; and/or allowing refrigerant to flow through the first expansion device when a high pressure event is not identified and/or when an identified high pressure event is terminated. For example, the bypass module may determine whether a high pressure event is occurring and transmit a signal to the bypass valve in response to the determination. The signal may open the bypass line when a high pressure event is identified and/or close the bypass line when a high pressure event is not identified. The bypass module may determine whether to allow the bypass operations, in some implementations. The compressor management module may perform compressor delay operations, such as: determining whether to allow a compressor delay operation; retrieving wait time(s), allowing operation of first and/or second compressors; and/or restricting operation of first and/or second compressors. For example, the compressor management module may receive requests for operation of an air conditioner, automatically request operation of an air conditioner, retrieve wait times, determine wait times, adjust wait times, allow operation of one or more of the compressors, restrict operation of one or more of the compressors, adjust expansion devices (e.g., allow more or less refrigerant to pass through the expansion device and/or adjust automatic control of refrigerant flow provided by an expansion device), determine whether high pressure events have occurred and/or have terminated, determine ambient temperatures, etc.

In some implementations, modules may be combined, such as into a single module or multiple modules. Operation modules, bypass modules, and/or compressor management modules may be distinct modules. In an implementation, operation modules and/or defrost modules may include various modules and/or sub-modules.

A communication interface may allow the controller to communicate with components of the heat pump, other repositories, and/or other computer systems. The communication interface may transmit data from the controller and/or receive data from other components, other repositories, and/or other computer systems via network protocols (e.g., TCP/IP, Bluetooth, and/or Wi-Fi) and/or a bus (e.g., serial, parallel, USB, and/or FireWire). Operations of the heat pump stored in the memory may be updated and/or altered through the communication via network protocols (e.g., remotely through a firmware update and/or by a device directly coupled to the controller).

The controller may include a presentation interface to present data to a user, such as though a monitor and speakers. The presentation interface may facilitate receipt of requests for operation from users.

A client (e.g., control panel in field or building) may allow a user to access the controller and/or instructions stored on the controller. The client may be a computer system such as a personal computer, a laptop, a personal digital assistant, a smart phone, or any computer system appropriate for communicating with the controller. For example, a technician may utilize a client, such as a tablet computer, to access the controller. As another example, a user may utilize a client, such as a smart phone, to access the controller and request operations.

Although FIG. 1 provides one example of controller that may be used with the disclosure, controller can be implemented through computers such as servers, as well as a server pool. For example, controller may include a general-purpose personal computer (PC) a Macintosh, a workstation, a UNIX-based computer, a server computer, or any other suitable device. In some implementations, a controller may include a programmable logic device. For example, the controller may be mounted to a wall of a location in which air conditioning may be provided. According to one implementation, controller may include a web server. Controller may be adapted to execute any operating system including UNIX, Linux, Windows, or any other suitable operating system. Controller may include software and/or hardware in any combination suitable to provide access to data and/or translate data to an appropriate compatible format.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementations in one or more computer programs that are executable and/or interpretable on a programmable system, including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable signal(s) may be non-transitory waves and/or non-transitory signals.

Although mechanical failure and mechanical failure events have been described as conditions that cause mechanical failure, conditions that precede mechanical failure may also be included, such as excessive wear on parts.

Although users have been described as a human, a user may be a person, a group of people, a person or persons interacting with one or more computers, and/or a computer system.

Various described patents and patent applications have been incorporated by reference. The described patents and patent applications are incorporated by reference to the extent that no conflict exists between the various described systems and/or processes and the described patents and patent applications. Any portion(s) of such described patents and patent applications that are in conflict with the various described systems and/or processes are not incorporated by reference.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "a mode of operation" includes a combination of two or more modes of operation and reference to "an expansion device" includes different types and/or combinations of expansion devices.

Although the present disclosure has been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. An air conditioner comprising:
   a microchannel condenser;
   one or more compressors;
   a primary expansion device;
   a bypass line comprising at least one of:
      a secondary expansion device; or
      a secondary expansion device and a bypass valve; and
   a controller configured to control refrigerant flow through the bypass line and the one or more compressors;
   wherein the bypass line is adapted such that when refrigerant flow is allowed through the bypass line, a first portion of refrigerant in the air conditioner bypasses the primary expansion device, and wherein the first portion of refrigerant is provided to the secondary expansion device; and
   wherein when a first high pressure event occurs the controller allows refrigerant through the bypass line and when a second high pressure event occurs the controller restricts operation of the one or more compressors.

2. The air conditioner of claim 1, further comprising:
   a memory storing one or more properties of high pressure events; and
   a controller adapted to:
      identify at least one high pressure event of the air conditioner based at least partially on one or more of the stored properties of high pressure events;
      if at least one high pressure event is identified:
         allow the first portion of the refrigerant to bypass the primary expansion device; and
         allow the first portion of the refrigerant to flow through the secondary expansion device; and
      if at least one high pressure event is not identified:
         allow the first portion of the refrigerant to flow to the primary expansion device; and
         restrict flow through the bypass line.

3. The air conditioner of claim 1, wherein the secondary expansion device comprises at least one of an orifice, a line comprising a smaller cross-sectional area than a cross-sectional area of a line coupled to another component of the air conditioner, a thermal expansion valve, an electronic expansion device, or a bypass thermal expansion valve.

4. The air conditioner of claim 1, wherein the air conditioner comprises more than one compressor, and wherein at least a first compressor and at least one second compressor comprises a tandem compressor assembly.

5. The air conditioner of claim 1, wherein at least one of the primary expansion device or the secondary expansion device comprises a thermal expansion valve, and wherein the thermal expansion valve comprises:
   a bulb, and wherein a temperature of the bulb at least partially controls an amount of refrigerant allowed to pass through the thermal expansion valve; and
   a heat transfer element; and
   wherein the controller is further adapted to:
      allow heat transfer between at least one of the heat transfer elements and the bulb to alter a temperature of the bulb prior to allowing the first portion of the refrigerant to bypass the primary expansion valve; and
      adjust an amount of refrigerant allowed to flow through the thermal expansion valve based at least partially on the altered temperature of the bulb.

6. The air conditioner of claim 1, wherein the bypass line comprises a secondary expansion device and a bypass valve; and wherein when the bypass valve is open, the first portion of the refrigerant in the air conditioner is allowed to bypass the primary expansion device.

7. The air conditioner of claim 1, wherein the bypass line comprises a secondary expansion device adapted to restrict and allow flow through the bypass line.

8. A method comprising:
   identifying at least one high pressure event of an air conditioner;
   allowing a first portion of a refrigerant in the air conditioner to bypass a primary expansion device, if a high pressure event is identified;
   allowing the first portion of the refrigerant to be provided to a secondary expansion device;
   identifying a second high pressure event of the air conditioner; and
   restricting operation of one or more compressors in the air conditioner if the second high pressure event is identified.

9. The method of claim 8, further comprising allowing a second portion of the refrigerant to be provided to the primary expansion device.

10. The method of claim 8, further comprising:
   determining whether one or more of the identified high pressure events has terminated; and restricting the flow of refrigerant to through the bypass line if a determination is made that one or more of the identified high pressure events has terminated.

11. The method of claim 8, wherein identifying at least one of the high pressure events comprises:
   determining an ambient temperature;
   determining a pressure of the air conditioner; and
   identifying a high pressure event when the determined ambient temperature exceeds a predetermined high ambient temperature and based on the determined pressure.

12. The method of claim 8, wherein the air conditioner comprises a first compressor and a second compressor; and wherein identifying at least one of the high pressure events comprises:
   determining whether a change in operation of the air conditioner from a first setting to at least one of a second setting or a third setting is occurring, wherein the first setting comprises allowing operation of the first compressor of the air conditioner and the second compressor of the air conditioner, and wherein the second setting comprises allowing operation of the first compressor and restricting operation of the second compressor, and wherein the third setting comprises restricting operation of the first compressor and restricting operation of the second compressor; and
   identifying a high pressure event when a determination is made that the change in operation of the air conditioner from at least one of the first setting to the second setting or the first setting to the third setting is occurring.

13. The method of claim 8, wherein identifying at least one of the high pressure events comprises at least one of identifying a high pressure event when a determination is made that the refrigerant level in the air conditioner is overcharged or determining whether a pressure of at least a portion of the air conditioner exceeds a predetermined high pressure.

14. The method of claim 8, further comprising allowing an operation of the air conditioner, wherein operation of the air conditioner comprises:
   allowing refrigerant to flow from an evaporator of the air conditioner to one or more compressors of the air conditioner;
   allowing refrigerant to flow from one or more of the compressors to a microchannel condenser of the air conditioner; and
   allowing refrigerant to flow from the microchannel condenser to at least one of the primary expansion device or the secondary expansion device; and
   wherein identifying at least one high pressure event comprises identifying at least one high pressure event during the operation of the air conditioner.

15. A method comprising:
   identifying at least one high pressure event in an air conditioner; if at least one high pressure event is identified,
      allowing a bypass operation of the air conditioner, wherein the bypass operation comprises:
         allowing a first portion of a refrigerant in the air conditioner to bypass a primary expansion device of the air conditioner; and
         allowing the first portion of the refrigerant to be provided to a secondary expansion device of the air conditioner; and
      allowing a compressor delay operation of the air conditioner, wherein the compressor delay operation comprises:
         retrieving a wait time based on one or more properties of at least one of the primary expansion device or the secondary expansion device;
         allowing operation of a first compressor of the air conditioner;
         restricting operation of a second compressor of the air conditioner for a period of time approximately equal to the retrieved wait time; and
         allowing operation of the second compressor after the period of time.

16. The method of claim 15, wherein allowing at least one of a bypass operation or a compressor delay operation inhibits shut down of the air conditioner.

17. The method of claim 15, further comprising:
   allowing the first portion of the refrigerant to be provided to the primary expansion device if at least one high pressure event is not identified; and
   restricting a flow of refrigerant through the secondary expansion device if at least one high pressure event is not identified.

18. The method of claim 15, further comprising:
   allowing the first portion of the refrigerant to be provided to the primary expansion device if at least one high pressure event is not identified; and
   closing a bypass valve such that a flow of refrigerant through the secondary expansion device is inhibited if at least one high pressure event is not identified.

19. The method of claim 15, wherein at least one of the primary expansion device or the secondary expansion device automatically controls an amount of refrigerant allowed to pass through the expansion device.

20. The method of claim 15, wherein when at least one high pressure event is identified, a bypass operation and a compressor delay operation are allowed such that a bypass operation may be allowed prior to allowing operation of at least one of the first compressor or the second compressor.

* * * * *